Dec. 1, 1931.  L. T. STARR  1,834,434

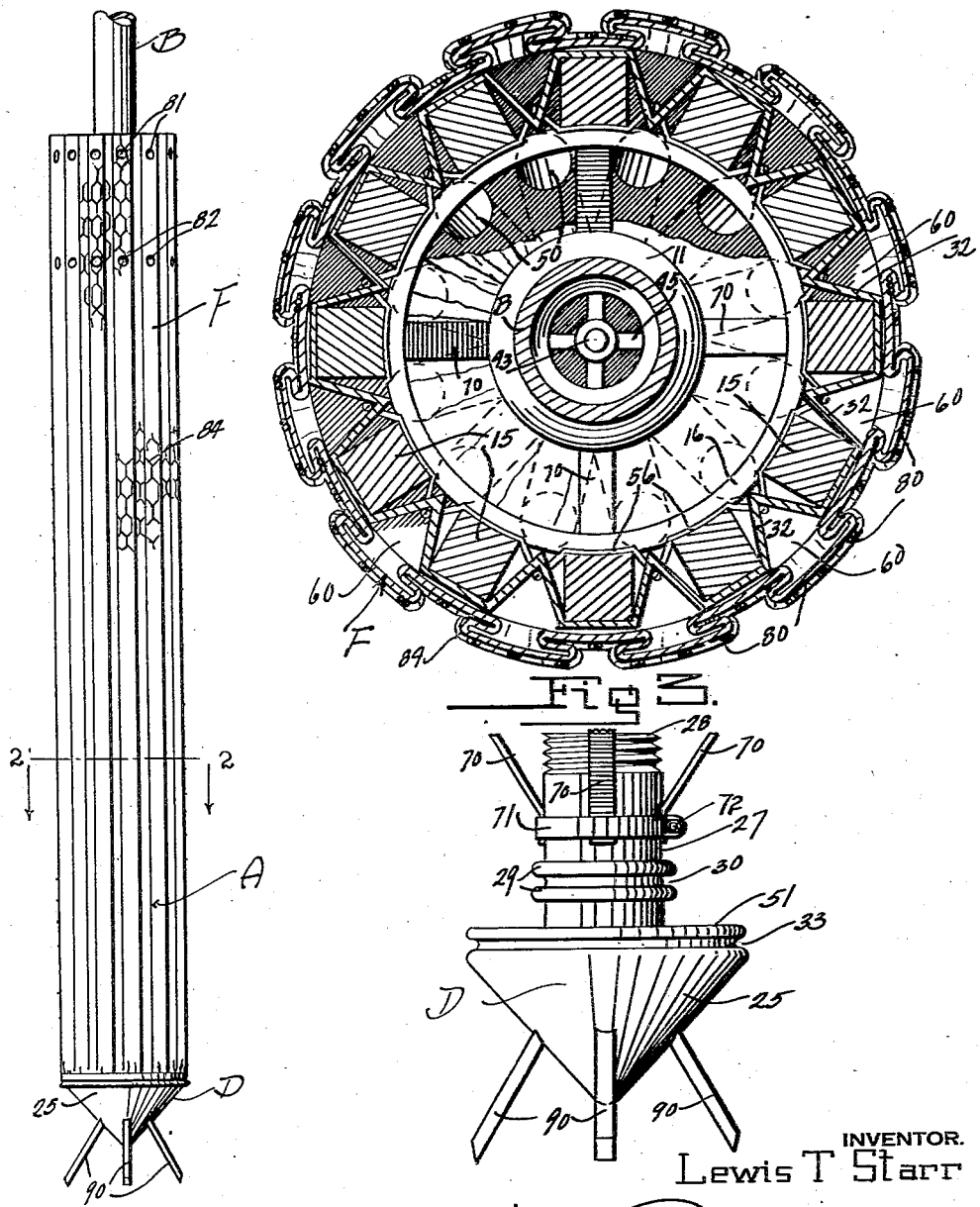

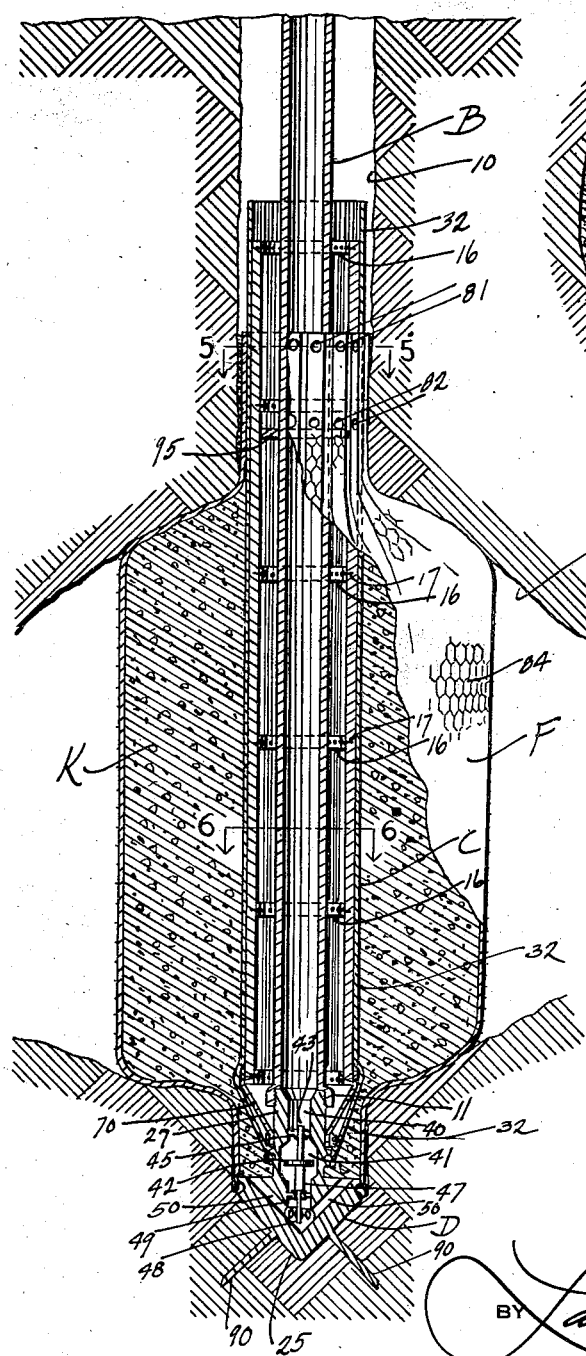
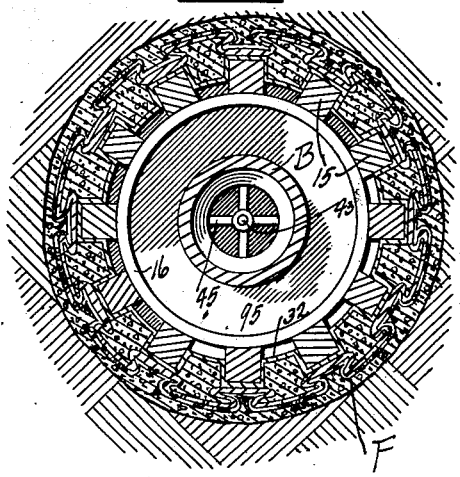
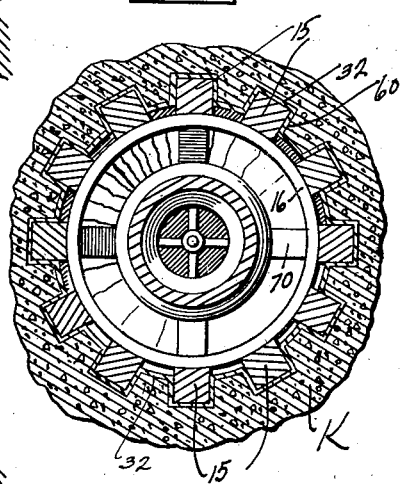

CAVITY AND CEMENT BASKET

Filed April 29, 1929  3 Sheets-Sheet 3

INVENTOR.
Lewis T. Starr
BY
ATTORNEYS.

Patented Dec. 1, 1931

1,834,434

UNITED STATES PATENT OFFICE

LEWIS T. STARR, OF PECOS, TEXAS

CAVITY AND CEMENT BASKET

Application filed April 29, 1929. Serial No. 359,070.

This invention relates to improvements in cement baskets particularly well adapted for sealing and plugging cavities which are encountered during or after the drilling of oil wells, to seal off water and gas.

The primary object of this invention is the provision of improved means for expeditiously and efficiently placing a cement plug in a room or cavity encountered during or after the drilling of an oil well, in such manner that the plug will not interfere with the withdrawal of the drill tubing or pipe thru which the cement is fed to form the plug, and which leaves a core cavity thru the plug which may be drilled or otherwise removed with ease, without destroying the effectiveness of the plug.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved collapsible basket, in its collapsed condition, as supported upon a drill tube or pipe, and in the condition in which it is lowered thru the well.
Figure 2 is a sectional view taken substantially on the line 2—2 of Figure 1.

Figure 3 is a side elevation of the lower end of the cement plug forming basket, showing the relation of parts by means of which inner and outer wall forming portions of the improved basket may be attached therewith.

Figure 4 is a vertical sectional view taken through a cavity or room such as is ordinarily encountered during the drilling of oil wells in some sections, showing the improved basket in position and the relation of parts and positions which they assume during the formation of the cement plug, which is shown sealing off the room or cavity from the well.
Figures 5 and 6 are sectional views taken substantially on their respective lines in Figure 4 of the drawings.

Figure 7:
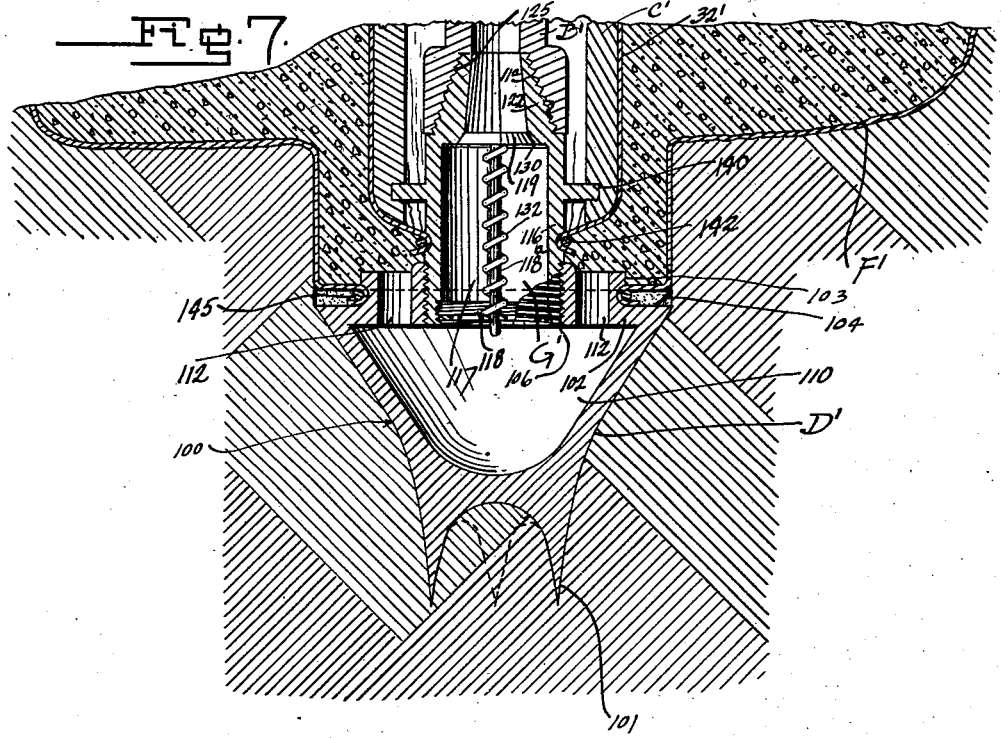
Figure 7 is a fragmentary enlarged sectional view showing a modified form of cement plug forming basket, having a novel type of valve cage and plug or coupling at the lower end thereof.

In the drawings, wherein for the purpose of illustration are shown preferred and modified forms of the invention, the letter A may generally designate the improved cement basket, which is adapted to be detachably connected with a drill stem or pipe B for use in forming a plug within an oil well.

As shown in Figure 4, the bore 10 of the oil well sometimes encounters an enlargement, cavity, or room 11, wherein water, gas, and like media unsuitable for support of a casing, which may become mixed with the petroleum, is encountered, during drilling, or subsequent thereto. It is well understood in the art that such cavities have to be plugged or filled, and it is conventional to fill the same with mud, and heretofore some devices have been provided for plugging the same with cement or concrete.

The improved device A is detachably connected at the lower end of a conventional drill tube or stem B. The stem B, of course, may comprise a plurality of sections, detachably connected together, and at the lower end thereof it is provided with an internally screw threaded socket 11, preferably provided with left hand threads therein for detachably receiving the basket A thereon, or in suitable connection for supporting said basket.

The basket A preferably comprises a tubular cage or casing C, the lower end of which is connected with a plug or coupling member D, which also supports the collapsible plug receiving and forming container F, in the form of a sack which circumscribes the cage or casing C.

The cage C preferably comprises a plurality of elongated staves 15, which are arranged in parallel relation in an annular arrangement and relatively connected in such position, spaced from each other, by means of a plurality of metal connecting supporting rings 16, which are disposed within the cage and connected as by means of screws, nails, or bolts 17 to each of the staves 15, as shown in Figure 4 of the drawings. These metal rings 16 are preferably of some soft metal, and they may be iron if desired. The staves 15 are preferably of oak, and are thus arranged by the bands 16 in a cylindrical relation, defining the passageway thru which the drill stem B extends freely, for detachable connection with the plug D, which is supported at the lower end of the staves 15, or the cage C, of which said staves are a part.

Referring to the member D, which forms the base of the device A, the same includes an inverted conical body 25, having a reduced upwardly extending shank 27 integral therewith. The shank 27 at its upper end is externally screw threaded at 28 for detachably receiving the socket connection 11 of the drill stem B. These screw threads 28 are preferably left hand screw threads. The shank 27 intermediate its ends is provided with spaced annular ribs 29, which therebetween define a groove 30 within which the lower end of the canvas or other flexible covering 32, which forms part of the cage or inner casing C, is connected, as will be subsequently described. At its upper maximum diameter the inverted conical base 25 is provided with a similar annular groove 33, wherein the lower end of the plug forming casing or sack F is connected.

The shank 27 of the member D is provided with a passageway 40, extending downwardly therethrough, which is enlarged at 41 just above the body 25, and which supports in said enlargement 41 a back pressure check valve 42. This valve 42 is disc-shaped and includes an upper reduced stem 43 reciprocably guided and supported by a spider 45. The disc valve 42 therebelow is provided with a reduced axial portion 47; the latter of which at its lower end is provided with a further reduced guide extension 48 reciprocably guided by a spider 49 in the passageway 43 extended, within the area of the body 25. The shoulder at the juncture of the portions 47 and 48 of the valve engages the spider 49 to limit the lowered movement of the valve 42, so that the latter is always open in the enlargement 41 of the passageway 43, until some back pressure forces the valve 42 upwardly against the upper end of the enlargement 41, which is restricted to provide a seat, for the purpose of closing off the passageway 43.

The body 25 is provided with a plurality of downwardly convergent ports or ducts 50, which at their upper ends open on the top surface 51 of the body 25, outwardly of the shank 27, as shown in Figure 4; these ducts 50 converging downwardly towards the axis of the member D and meeting in a compartment below the spider 49. This compartment is of course part of the passageway 40 thru the member D.

Referring again to the cage or casing C, the cylindrically arranged staves 15 are externally covered by a canvas or other flexible covering 32 above mentioned, which may be externally secured in any approved relation upon the outer surfaces of said staves 15. A preferred means of connecting the covering 32 is shown in Figure 2 of the drawings, by means of threads, stitched as shown at 56. The stitches 56 extend across the inside of the staves or pieces 15, and at their ends engage the canvas or other covering material in the spaces between the staves, drawing the same in said spaces in a U or V-shaped relation. It should be noted that the extended diameter of the covering 32 is considerably greater than the external diameter of the cylinder provided by the staves 15. The slack in this covering 32 is taken up by drawing the stitches 56 taut, with the spare material of the covering 32 drawn into the spaces between the staves 15, to provide longitudinal grooves 60 externally upon the cage C, thru which the cementitious material is adapted to be forced, longitudinally within the outer casing F, to efficiently fill the same when providing the plug.

The covering 32 extends below the lower end of the staves 15, and the lower end is crimped by means of a band, shown in Figure 4, in the groove 30. Furthermore, the base B is rigidly connected with the lower end of the cage C by means of arms 70, shown in Figures 2 and 4 of the drawings, which are connected to the lower ends of each of the staves 15, or to alternate staves, or any number of staves, and which arms 70 extend downwardly in a convergent relation and at their lower ends are connected with a ring 71, which is preferably split and provided with means 72 by means of which to clamp the same upon the shank 27 of the metal base D. Of course, the flexible canvas covering 32 embraces the arms 70 and the connection thereof with the shank 27.

The flexible outer casing F, at its lower end is connected by a band, or any other approved means, in the groove 33, of the body 25, in a very secured relation. Thus, it is to be noted that the ducts 50 open on the surface 51 of the base body 25, into the compartment of the outer expansible flexible casing F.

The outer casing F may be expanded to any desired maximum diameter, consistent with the maximum diameter at which it is desired to form the plug of concrete or cement, designated at K in Figure 4 of the drawings. When collapsed the casing F is pleated, as shown at 80 in Figure 2 of the drawings, in such relation as not to obstruct the channels or grooves 60 thru which the cement flows upwardly along the sack or container F to form the plug K. The outer casing or sack F at its upper end is free of connection with the inner cage or casing C, and at its upper end it is provided with spaced series of openings 81 and 82 therethrough.

I also may provide expansible wire screening material 84, forming a network externally about the canvas outer casing F, as a reinforcing for the same, and which wire netting 84 is of such a nature as to readily pleat with the canvas outer casing F, and expand therewith.

The operation of the invention will be apparent from the foregoing. The improved cavity and cement basket may be of any approved length. The inner cage C is readily disconnectible with the base and valve supporting plug D, so that the inner cage or casing C may be initially formed in lengths of from 20 to 40 feet, and cut to the proper length consistent with the height of the cavity or room 11 in which the plug K is to be formed. In practice, the outer expansible casing or container F is about as long as the inner cage or casing C, and they are both connected to the base plug D in the relation above described. The lower end of the drill tube or pipe B is connected directly at its socket 11 with the upper end of the shank 27, as by a screw threaded connection, or a suitable coupling may be interposed therebetween, such as the conventional bayonet joint coupling, which affords a positive and efficient quick releasing and connecting means. The tube B having been connected to the improved cavity or cement basket A, in the relation above described, the same is lowered into the well, and it may find its way along the well bore 10, because of the compact relationship in which the basket may be collapsed, as shown in Figure 1. The drill tubing or pipe is lowered until the basket A is opposite the cavity or room 11, and under such circumstances the lower end or body of the base B will rest on the solid soil at the bottom of the cavity. To prevent its turning, it is preferred to provide the body 25 with a plurality of downwardly divergent prongs 90, which engage in the soil below the cavity or room 11. These preliminaries having been attended to, the cementitious material is fed downwardly thru the passageway of the drill pipe or tube B, and by the weight thereof it will open the valve 45 and escape thru the ducts 50 upwardly into the compartment between the inner casing and the outer casing of the cement basket. The weight of the cement and the force which feeds the same into the cement basket will cause the outer casing F to expand in the room 11, throughout the height thereof along the bore of the well, and inasmuch as the upper end of the outer casing F extends into the bore 10 above the cavity 11, there will be little liability of the cement being forced out of the expansible outer casing or container F which receives the same. The cementitious material will find its way upwardly through the channels or grooves 32 provided exteriorly upon the cage or inner casing C, and completely fill the outer casing F along the height of the cavity 11. When the plug is about formed there will be an attempt for the cement to push its way upwardly through the bore of the well above the cavity, but the cement will pass laterally thru the openings 81 and 82 into the well bore externally of the outer casing F, and seal off the casing F. It is to be readily seen that this manner of forming a plug K to seal off the cavity is very desirable, because the cement plug does not come in contact with the drill tube or stem B and cannot prevent its facile withdrawal. When the plug K is completed, the gravity back pressure of the cementitious material on the valve 45 will close the same and prevent the cement from entering the tube B, or the casing C in event the tube B has been withdrawn.

To steady and properly center the tube B in the inner casing C, at the upper end of the latter, or at spaced intervals therealong, flexible fiber ring-shaped washers 95 are employed, as shown in Figure 4, and in Figure 5. These washers may readily withdraw with the drill tubing B, when the socket end or a joint of the latter comes into contact with the washers 95. It is readily understandable that the tube B may be rotated for disconnection from the cement cage, because the latter is non-rotatably held by the prongs 90.

After the cement plug has set, suitable drilling tools may be lowered into the well to bore out the core of the plug, and in this connection, if found necessary, the entire inner casing C may be bored out from the plug, together with the base B at the lower end thereof, due to the fact that the same are made of soft or materials which may be easily bored and removed. The plug D may be made of cast iron, or babbitt. The canvas or fabric portions for the inner and outer casings D and F may be heavy canvas, such as 18 or 20 ounce material. The outer casing C will expand to about three times the size of its normal collapsed diameter when being lowered into the well.

If found necessary the outer expansible casing or container F may be made of two layers of flexible fabric material with an intermediate layer of expansible wire netting, in lieu of the arrangement above shown and described.

Figure 8:
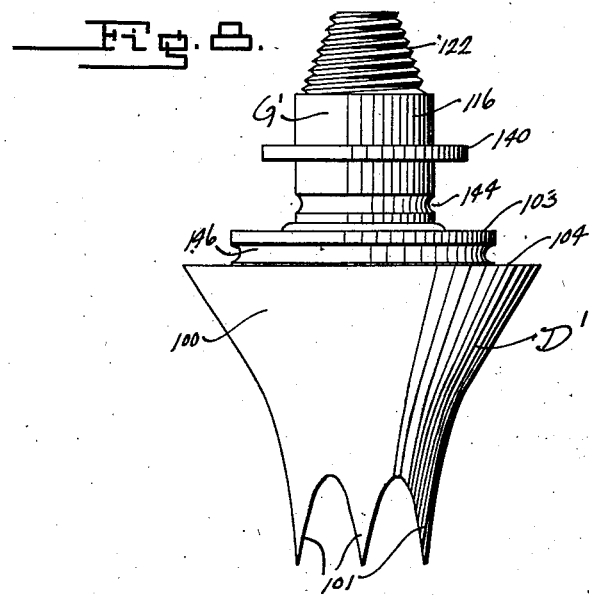
Figure 8 is a side elevation of the modified form of anchor plug.

Referring to the modified form of invention shown in Figures 7 and 8, the same includes a cage C', of substantially the same general construction as the inner casing C above described for the preferred form of invention. A novel type of anchor plug D' is provided, having detachably connected therewith a valve cage G', to which a drill stem B' is detachably connected, and to which also may be detachably connected the inner cage C'. The outer expansible preferably fabric casing F' is of the same nature as above described for the preferred form of invention.

Referring to the anchor plug D', the same is preferably of metal construction, including a hollow inverted frusto-conical body 100, the reduced end of which is provided with contiguous spear-like projections 101 for engagement in the earth or soil formation. At its upper or larger end the hollow body 100 is provided with a top wall 102, upon which is provided an upwardly extending reduced collar 103, the periphery of which is disposed inwardly from the extreme annular periphery or margin of the body 100 to define an upwardly facing surface 104, normally disposed in a horizontal plane. The shoulder 103 of the wall 102 is provided with a central screw threaded opening 106 therethrough, for detachably receiving the cage C', in a manner to be subsequently described. In the body 100 below the wall 102 is provided a compartment 110, which is relatively large, and which converges downwardly to a concavely arcuated bottom which assist in directing the cementitious material upwardly toward the wall 102 after it has entered the compartment 110, and through the vertical openings 112, which are provided in any approved number surrounding the screw threaded opening 106. The openings 112 are of course extended through the collar 103, as shown in Figure 7.

The valve cage G' includes the body 116, which is cylindrical in form at its lower portion, and externally screw threaded at its lower end for detachable connection in the screw threaded opening 106. It provides a passageway or compartment 117 therethrough, which at the lower end is internally screw threaded for receiving a spider 118 in a detachable relation, upon which a valve stem 118ª of a valve 119 is reciprocably mounted for operation.

The valve casing 116 is provided with an upper conical shaped reduced externally screw threaded extension 122, which tapers upward in a convergent relation, and is adapted to be detachably connected with the tapered screw threaded socket 125 within the lower end of the drill stem or supporting pipe B'. This type of connection enables quick attachment and detachment of parts without unnecessary rotation of the drill stem and pipe, as will be well understood. At the juncture of the screw threaded shank portion 122 with the body of the valve casing 116, there is a beveled valve seat 130, upon which the valve head 119 may seat. A spring 132 surrounding the valve stem 118ª is under compression between the valve head and the spider 118, normally tending to seat the valve. The valve head 119 is less in diameter than the diameter of the compartment or passageway 117, so that when the cement passing downwardly through the drill stem B', unseats the valve head 119, the said cement will pass around the periphery thereof downwardly through the compartment or passageway 117, and through the openings in the spider 118 into the compartment 110, and then be forced upwardly through the openings 112 in the same relation as above described for the preferred form of invention.

An annular flange 140 may be provided upon the casing of the valve cage, for receiving the body or stave details of the inner casing C'.

The inner flexible casing portion 32' may be detachably seated by means of a resilient ring 142 on the body of the valve cage below the flange 140, but above the openings 112 and in non-restricting relation with the latter. An annular groove 144 is provided in the valve cage body to facilitate such attachment.

The outer flexible bag or casing F' is held in place by means of a contractile band 145, is adapted to seat in an annular groove 146 provided on the upstanding collar portion 103 above described, and in such relation that the cementitious material may pass into the improved device between the inner casing and the flexible outer casing F', for the purposes above described in connection with the preferred embodiment of this invention.

Various changes in the shape, size, and arrangement of parts may be made to the form of invention herein shown and described, without departing from the spirit of the invention or the scope of the claims.

I claim:

1. In a plug providing unit the combination of an inner longitudinally rigid tubular casing of a nature to be freely lowered into a conventional oil well shaft and having external grooves longitudinally thereof, a laterally expansible container connected with the lower portion of said casing and of a nature to be laterally expanded to provide a compartment several times the diameter of the casing first mentioned, and means for feeding cementitious material through the casing free of contact therewith into the lower portion of the laterally expansible container and upwardly along the external grooves of said casing to fill said laterally expansible container throughout its length.

2. In a plug providing unit the combination of an inner longitudinally rigid tubular casing of a nature to be freely lowered into a conventional oil well shaft and having external grooves longitudinally thereof, a laterally expansible container connected with the lower portion of said casing and of a nature to be laterally expanded to provide a compartment several times the diameter of the casing first mentioned, means for feeding cementitious material through the casing free of contact therewith into the lower portion of the laterally expansible container and upwardly along the external grooves of said casing to fill said laterally expansible container throughout its length, and check valve means to prevent back flow of cementitious material into the last mentioned means.

3. In a unit for forming a plug within an oil well cavity the combination of an inner tubular elongated casing comprising an annular arrangement of spaced elongated staves having an outer flexible covering secured therewith and drawn taut in the spaces between said staves to provide external grooves longitudinally of said casing, and a laterally expansible flexible container receiving the casing therein and connected with the latter at the lower end thereof, said connection having a duct extending from within the said casing to the compartment in the laterally expansible casing for feed of cementitious material into the latter.

LEWIS T. STARR.